United States Patent
Reddy et al.

(10) Patent No.: US 7,016,673 B2
(45) Date of Patent: Mar. 21, 2006

(54) WIRELESS COMMUNICATION METHOD AND SYSTEM WITH CONTROLLED WTRU PEER-TO-PEER COMMUNICATIONS

(75) Inventors: Gautam G. Reddy, King of Prussia, PA (US); Prabhakar R. Chitrapu, Blue Bell, PA (US); Leonid Kazakevich, Plainview, NY (US); Teresa Joanne Hunkeler, Montreal (CA); Arty Chandra, Hempstead, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 146 days.

(21) Appl. No.: 10/675,893

(22) Filed: Sep. 29, 2003

(65) Prior Publication Data

US 2004/0127214 A1    Jul. 1, 2004

Related U.S. Application Data

(60) Provisional application No. 60/415,281, filed on Oct. 1, 2002.

(51) Int. Cl.
    *H04Q 7/20* (2006.01)
(52) U.S. Cl. .............................. 455/426.2; 455/552.1; 455/456.1; 455/456.3
(58) Field of Classification Search ............ 455/426.2, 455/552.1, 550.1, 414.1, 557, 456.1, 456.3
    See application file for complete search history.

(56) References Cited

U.S. PATENT DOCUMENTS

| | | | |
|---|---|---|---|
| 5,231,634 A | 7/1993 | Giles et al. | |
| 6,014,568 A | 1/2000 | Alperovich et al. | |
| 6,026,304 A | 2/2000 | Hilsenrath et al. | |
| 6,154,172 A | 11/2000 | Piccionelli et al. | |
| 6,208,861 B1 | 3/2001 | Suzuki | |
| 6,463,289 B1 | 10/2002 | Havinis et al. | |
| 6,553,233 B1 | 4/2003 | Lee et al. | |
| 6,560,642 B1 | 5/2003 | Nurmann | |
| 6,804,532 B1 * | 10/2004 | Moon et al. ............. | 455/552.1 |
| 2002/0071413 A1 | 6/2002 | Choi | |
| 2002/0090953 A1 | 7/2002 | Aburai et al. | |
| 2002/0128000 A1 * | 9/2002 | do Nascimento, Jr. ...... | 455/414 |
| 2002/0181510 A1 | 12/2002 | Abrol et al. | |
| 2002/0191575 A1 | 12/2002 | Kalavade et al. | |
| 2003/0008644 A1 | 1/2003 | Akhterzzaman et al. | |

(Continued)

FOREIGN PATENT DOCUMENTS

CN        1068691        2/1993

(Continued)

*Primary Examiner*—Joseph Feild
*Assistant Examiner*—Huy D. Nguyen
(74) *Attorney, Agent, or Firm*—Volpe and Koenig, P.C.

(57) ABSTRACT

A wireless network provides controlled wireless communications with multi-mode wireless WTRUs. The wireless network has at least one base station having a transceiver operating in an infrastructure communication mode with multi mode WTRUs and a controller that transmits control signals via infrastructure communications with a WTRU that control peer-to-peer mode communications of that WTRU with other WTRUs. A WTRU has transceiver components configured for selective operation in an infrastructure communication mode with a network base station and in a peer-to-peer communication mode with other WTRUs. The WTRU also has a transceiver controller configured to selectively control peer-to-peer mode communications with other WTRUs based on communication signals received in infrastructure communications with a network base station. Preferably, the transceiver controller is configured to control the transceiver components to switch between infrastructure communication mode and peer-to-peer communication mode based on Quality of Service criteria.

17 Claims, 3 Drawing Sheets

U.S. PATENT DOCUMENTS

| | | |
|---|---|---|
| 2003/0032434 A1 * | 2/2003 | Willner et al. .............. 455/456 |
| 2003/0109284 A1 | 6/2003 | Akerberg et al. |
| 2003/0142652 A1 | 7/2003 | Ting et al. |
| 2003/0174682 A1 | 9/2003 | Baker, Jr. |
| 2003/0235175 A1 | 12/2003 | Naghian et al. |
| 2004/0004951 A1 | 1/2004 | Zuniga et al. |
| 2004/0053602 A1 * | 3/2004 | Wurzburg ................ 455/412.1 |
| 2004/0203638 A1 * | 10/2004 | Chan et al. .............. 455/414.1 |
| 2004/0204071 A1 * | 10/2004 | Bahl et al. .................. 455/557 |
| 2004/0220995 A1 | 11/2004 | Tsutsumi |
| 2004/0224682 A1 | 11/2004 | Kang |

FOREIGN PATENT DOCUMENTS

| | | |
|---|---|---|
| CN | 1360798 | 7/2002 |
| CN | 1376001 | 10/2002 |
| CN | 1396784 | 2/2003 |
| JP | 7-107031 | 4/1995 |
| JP | P2000-40990 | 6/1999 |
| JP | 0 963 061 | 12/1999 |

* cited by examiner

WIRELESS COMMUNICATION METHOD AND SYSTEM WITH CONTROLLED WTRU PEER-TO-PEER COMMUNICATIONS

CROSS REFERENCE TO RELATED APPLICATION(S)

This application claims priority from U.S. Provisional Application No. 60/415,281 filed on Oct. 1, 2002, which is incorporated by reference as if fully set forth herein.

FIELD OF INVENTION

This application relates to methods and systems for wireless communication with controlled wireless transmit/receive unit (WTRU) peer-to-peer communications.

BACKGROUND OF THE INVENTION

Wireless communication systems are well known in the art. Generally, such systems comprise communication stations, which transmit and receive wireless communication signals between each other. Depending upon the type of system, communication stations typically are one of two types: base stations or wireless transmit/receive units (WTRUs), which include mobile units.

The term base station as used herein includes, but is not limited to, a base station, Node B, site controller, access point or other interfacing device in a wireless environment that provides WTRUs with wireless access to a network with which the base station is associated.

The term WTRU as used herein includes, but is not limited to, a user equipment, mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Typically, a network of base stations is provided where each base station is capable of conducting concurrent wireless communications with appropriately configured WTRUs. Some WTRUs are configured to conduct wireless communications directly between each other, i.e., without being relayed through a network via a base station. This is commonly called peer-to-peer wireless communications. WTRUs can be configured for use in multiple networks with both network and peer-to-peer communications capabilities.

One type of wireless system, called a wireless local area network (WLAN), can be configured to conduct wireless communications with WTRUs equipped with WLAN modems that are also able to conduct peer-to-peer communications with similarly equipped WTRUs. Currently, WLAN modems are being integrated into many traditional communicating and computing devices by manufacturers. For example, cellular phones, personal digital assistants, and laptop computers are being built with one or more WLAN modems. Accordingly, there is an increasing need to facilitate communications among such WTRUs with WLAN modems. For instance, it would be desirable if a first user of a PDA equipped with a WLAN modem could share data, such as a phone book, with a second user having a cellular phone equipped with a WLAN modem locally, without going through a telecommunications network.

A popular wireless local area network environment with one or more WLAN access points, i.e., base stations, is built according to the IEEE-802.11b standard. The wireless service areas for such WLANs are often restricted to geographic areas, commonly referred to as "Hot Spots". Such wireless communication systems are advantageously deployed in a wide variety of locations such as airports, coffee shops, and hotels to name just a few contexts. Access to these networks usually requires user authentication procedures. Protocols for such mode, it typically ignores infrastructure mode base station transmissions. It is also necessary for one WTRU to initiate ad hoc mode and other WTRUs to join in. The other stations will assimilate the operating parameter information as they join the ad hoc network.

The station that starts an ad hoc network selects the ad hoc network's operating parameters, such as the service set identifier (SSID), channel and beacon timing, and then transmits this information in, for example, beacon frames. As stations join the ad hoc network, they assimilate the operating parameters. In infrastructure mode, parameters such as the SSID are normally specified by a network controller connected to network base stations.

The SSID in an IEEE 802 based system can be a 32-character unique identifier attached to a header of packets sent over a WLAN. The SSID then acts as a password when a WTRU attempts to connect to a BSS or an independent BSS. The SSID differentiates one WLAN from another, so all base stations and all devices attempting to connect to a specific WLAN normally use the same SSID. A device will not normally be permitted to join a BSS unless it can provide the unique SSID.

In an IEEE 802 based system, once more than one station is part of an ad hoc network, all of the stations share the burden of sending beacon frames by a random distribution of that task to each station. Algorithms such as the spokesman election algorithm have been designed to "elect" one device as a master station (i.e., pseudo base station) of the ad hoc network with all others being slaves.

Various problems are common with open ad hoc networks which are essentially only self controlled. When a large number of WTRUs congregate in a small area, interference increases, thereby decreasing the throughput of all the WTRUs. In addition, when the overabundance of ad hoc wireless devices are concentrated in a hot spot area served by a base station of a WLAN, the communications between all such devices can be impeded since there are limits in frequency, channels, and bandwidth resources available for each wireless mode. systems are presently being standardized in the WLAN technology area. One such framework of protocols is the IEEE 802 family of standards.

There are two prevalent ways to implement wireless communications in WLAN and other networks: 1) an infrastructure mode; and 2) an ad hoc mode. FIG. 1A illustrates an infrastructure mode, where WTRUs conduct wireless communications via a base station 54 that serves as an access point to network infrastructure 16. The base station 54 is shown as conducting communications with WTRU 18, WTRU 20, WTRU 22, WTRU 24, and WTRU 26. There are no direct intercommunications between the WTRUs illustrated in FIG. 1A. The communications are coordinated and synchronized through the base station 54. Such a configuration is also called a basic service set (BSS) within WLAN contexts.

In contrast to the infrastructure mode, the ad hoc mode does not use network infrastructure. The ad hoc mode operates with peer-to-peer communications and is also called "independent BSS". In ad hoc mode, two or more WTRUs establish a communication among themselves without the need of a coordinating network element, i.e., base station. Ad hoc mode operation is illustrated in FIG. 1B. No access points to the network infrastructure are required. However, a base station can be configured with the ad hoc protocols to act as the other WTRUs in peer-to-peer communications. In such case, a base station may act as a bridge or a router to another network or to the Internet.

Where a base station does join an ad hoc network, it is treated as another WTRU and does not normally control the flow of communication. For example, FIG. 1B illustrates base station 54 in communication with WTRU 18 and WTRU 20 in an ad hoc network. In this scenario, the base station 54 does not control the flow of data.

Communications are normally limited to the other stations in an ad hoc network, but one WTRU may communicate indirectly with another WTRU via a third WTRU. For example, as shown in FIG. 1B, where both WTRU 22 and WTRU 24 are communicating in ad hoc mode with WTRU 26, communications may occur between WTRU 22 and WTRU 24. Additionally, when a WTRU is in ad hoc Another drawback of the open ad hoc networking is that it can affect the business model of a WLAN operator. The inventors have recognized that if peer-to-peer ad hoc mode communications are allowed without any overall control or monitoring, a WLAN operator loses revenue by not being able to charge for the WLAN infrastructure that is available and must be maintained even when it is not being used for infrastructure mode communications. It is therefore desirable to have a hybrid operational mode where peer-to-peer communications are controlled and/or monitored.

The inventors have recognized that other advantages can be gained through implementation of a hybrid ad hoc/infrastructure mode. For example, a mobile WTRU may travel into areas of poor signal quality where the communications with the network may become sporadic or nonexistent. In such cases, it would also be desirable if the WTRU can use a hybrid mode to relay communication through another WTRU which is in direct contact with a network base station.

SUMMARY

The present invention comprises a method and a system that uses wireless transmit receive units (WTRUs) having both ad hoc and infrastructure modes of operation.

A WTRU in accordance with the invention is used for infrastructure communication in a wireless network via network base stations and for peer-to-peer communications with other such WTRUs. The WTRU has transceiver components that are configured for selective operation in an infrastructure communication mode for infrastructure communication with a network base station and in a peer-to-peer communications mode for peer to peer communications with other WTRUs. The transceiver components may include a wireless local area network (WLAN) modem for the peer-to-peer communications with other WTRUs.

The WTRU also has a transceiver controller configured to selectively control peer-to-peer mode communications with other WTRUs based on communication signals received in infrastructure communications with a network base station. Preferably, the transceiver controller is configured to control the transceiver components to switch between infrastructure communication mode and peer-to-peer communication mode based on Quality of Service criteria.

Preferably, the transceiver controller is configured with selected default control limits for peer-to-peer mode communications that can be overridden based on communication signals received in infrastructure communications with a network base station. The transceiver controller selected default control limits for peer-to-peer mode communications may include a maximum duration of a peer-to-peer communication and a restriction as to types of data traffic permitted in peer-to-peer communications. Alternatively, the transceiver controller can be configured to control each peer-to-peer mode communications based on settings received in infrastructure communications with a network base station.

Typically, the WTRU is a mobile unit. The transceiver controller can then be configured to control the transceiver components to switch between infrastructure communication mode and peer-to-peer communication mode based on an estimate of the geographic location of the mobile unit. In such case, the WTRU preferably includes a Global Positioning System (GPS) for generating the estimate of the geographic location of the mobile unit.

Preferably, the WTRU transceiver components are also configured to selectively function in a relay mode to relay a communication between a network base station via infrastructure communication mode and another WTRU via peer-to-peer communication mode. In such case, the transceiver controller is preferably configured to control the transceiver components to function in the relay mode based on Quality of Service criteria.

Various methods of wireless communication for a WTRU having transceiver components that are configured for selective operation in infrastructure communication mode and in peer-to-peer communications mode are disclosed. Peer-to-peer mode communications with other WTRUs are selectively controlled based on communication signals received in infrastructure communications with a network base station.

In one method, selected default control limits are used for peer-to-peer mode communications and the defaults are overridden based on communication signals received in infrastructure communications with a network base station. A maximum duration of a peer-to-peer communication and a restriction as to types of data traffic permitted in peer-to-peer communications can be included as the default control limits used for peer-to-peer mode communications.

A WLAN modem can be used for the peer to peer communications with other WTRUs. Preferably, the WTRU transceiver components are switched between infrastructure communication mode and peer-to-peer communication mode based on Quality of Service criteria. This may include the transceiver components being switched between infrastructure communication mode and peer to peer communication mode based on an estimate of the geographic location of the WTRU where the WTRU is a mobile unit. In such case, the WTRU preferably includes a Global Positioning System (GPS) that is used for generating the estimate of the geographic location of the mobile unit.

Another method includes the WTRU transceiver components being configured to selectively function in a relay mode to relay a communication between a network base station via infrastructure communication mode and another WTRU via peer-to-peer communication mode. In such case, the WTRU transceiver components are preferably controlled to function in the relay mode to based on Quality of Service criteria.

The invention also provides a wireless network for providing controlled wireless communications with multi-mode wireless WTRUs as referenced above. The wireless network has at least one base station having a transceiver configured for selective operation in an infrastructure communication mode with multi-mode WTRUs. The wireless network also has a controller configured to selectively control transmission of control signals via infrastructure communications with a WTRU to control peer-to-peer mode communications of that WTRU with other WTRUs. Preferably, the controller is configured to selectively control transmission of control signals via infrastructure communications with a WTRU to control that WTRU to switch between infrastructure communication mode and peer-to-peer communication mode based on Quality of Service criteria.

Where the WTRUs have default control limits, the controller is preferably configured provide override control signals to override selected default WTRU control limits for peer-to-peer mode communications. Where the WTRUs include a WLAN modem for the peer-to-peer communications with other WTRUs, the network controller is configured to selectively control transmission of control signals via infrastructure communications with a WTRU to control WLAN peer-to-peer mode communications of that WTRU with other WTRUs.

Where at least some of the WTRUs are mobile units, the controller is preferably configured to selectively control transmission of control signals via infrastructure communications with a mobile unit to control that mobile unit to switch between infrastructure communication mode and peer-to-peer communication mode based on an estimate of the geographic location of the mobile unit and/or an estimate of congestion. In such case, the network may include a processing component for generating the estimate of the geographic location of the mobile unit based on reception of transmissions form the mobile unit. Also, the WTRUs may send test packets to generate an estimate of congestion.

A method of wireless communication for a wireless network is provided. Controlled wireless communications with multi-mode WTRUs as referenced above is conducted. The method includes transmitting from a network base station in an infrastructure communication mode control signals to a WTRU to control peer-to-peer mode communications of that WTRU with other WTRUs. Preferably, the control signals are transmitted to the WTRU to switch between infrastructure communication mode and peer-to-peer communication mode based on Quality of Service criteria.

Selected default control limits can be used for peer-to-peer mode communications. In such case the defaults are preferably overridden based the control signals transmitted by the network base station. Preferably, a maximum duration of a peer-to-peer communication and a restriction as to types of data traffic permitted in peer-to-peer communications are included as the default control limits used for peer to peer mode communications.

Other objects and advantages of the present invention will be apparent to persons skilled in the art from the following description and accompanying drawings.

DETAILED DESCRIPTION OF THE PREFERRED EMBODIMENTS

Figure 1A:
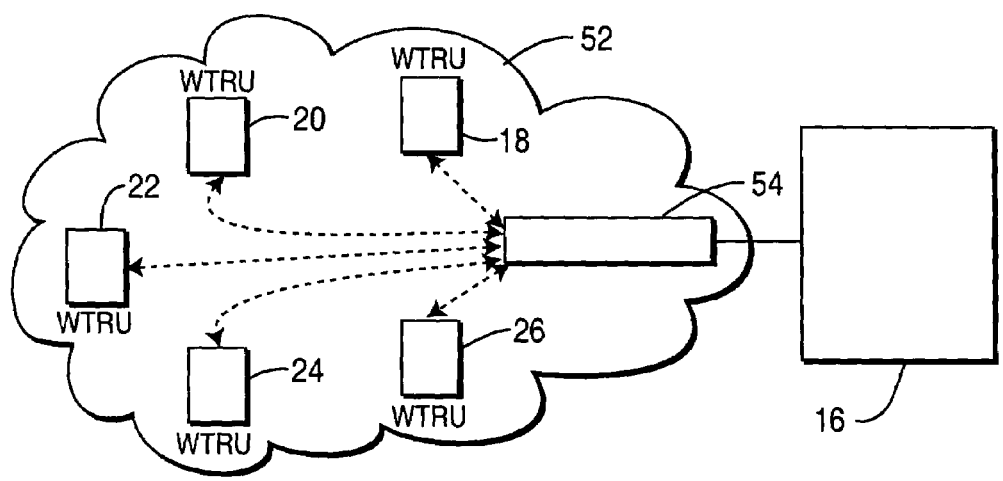
FIG. 1A is a diagram of a communications system operating in an infrastructure network mode of operation.
Figure 1B:
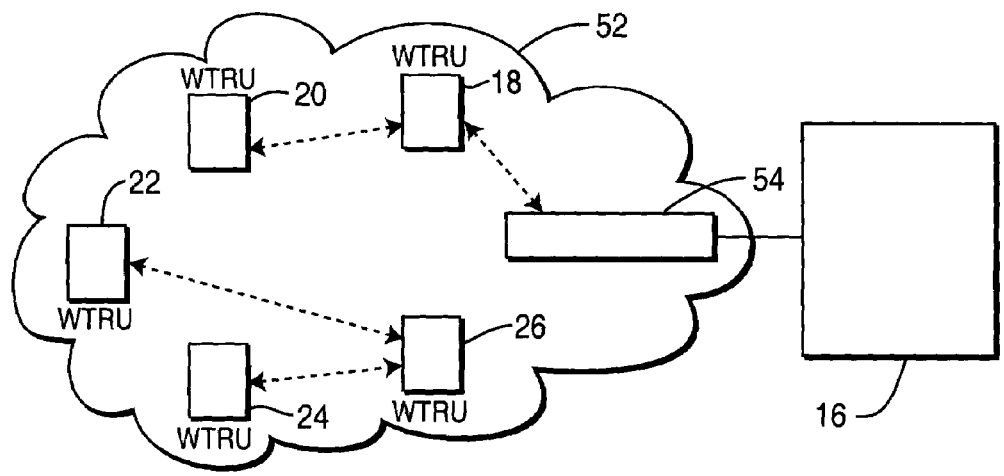
FIG. 1B is a diagram of a communications system operating in an ad hoc network mode of operation.

The present invention is described with reference to the drawing figures wherein like numerals represent like elements throughout. The terms base station, WTRU, and mobile unit are used in their general sense as described above. The present invention provides a wireless radio access network having one or more networked base stations through which wireless access service is provided for WTRUs. The invention is particularly useful when used in conjunction with mobile units, i.e., mobile WTRUs, as they enter and/or travel through the respective areas of geographic coverage provided by the respective base stations.

In accordance with the invention, WTRUs are configured with a peer-to-peer mode of operation, preferably, by being equipped with wireless local area network (WLAN) modems to exchange information directly between similarly equipped WTRUs. The WTRUs can have an integrated or installed wireless WLAN device, such as 802.11(b) (WiFi) or Bluetooth compliant device, in order to communicate with each other. However, the proposed invention is applicable in any wireless system that implements a peer-to-peer mode of operation and also has at least one network base station accessed by WTRUs For example, referring to FIG. 2, a first user 31 is illustrated operating a first WTRU 33 in the form of a Pocket PC-type phone device with an 802.11(b) WLAN card 35 installed. The WTRU 33 may be connected to a wireless telecommunications network 27 via a base station 25. The WTRU 33 transmits and receives radio frequency (RF) signals via antenna 34 to and from the base station 25. The Pocket PC type phone device 33, as is typical of such devices, contains a database with a phone book 38.

A second user 35 is illustrated operating a second WTRU 37 in the form of a cell phone with a built in Palm-type device including built-in 802.11(b) WLAN 36. The WTRU 37 can also connect with the wireless telecommunications network 27 via signals transmitted and received by antenna 39. The second user 35 may wish talk to the first user 31 or to access or copy the phone book 38 located in the first WTRU 33. Since both WTRUs 33, 37 have a WLAN modem and also a phone network interface, the users 31, 35 are able to communicate either by means of peer-to-peer communication 40 using an 802.11(b) wireless network or by using the telecommunications network 27. Accordingly, there is a decision to be made as to which type of communication mode is to be used.

By shifting communications between WTRUs from an infrastructure mode to a peer-to-peer mode, the network can conserve telecommunication network resources and thereby realize increased service capacity. Other benefits can be realized in the potential for reduced interference and/or power conservation which is important to mobile WTRUs that operate using battery power.

The decision to bypass a communications network and use peer-to-peer techniques can be made by the WTRUs, but can also be made by the communications network. A variety of factors can be used to make such decisions. One preferred decision factor is the Quality of Service (QoS) between the WTRUs and a communication network's base station. In this regard, QoS as a decision factor is viewed in its broadest sense and can be formulated from a number of criteria including: quality of the radio signal, power consumption, and/or the cost of the communication.

Currently, communications via the mobile network are likely to be more than either via a home or office local network, but there can be varying cost factors between such local networks as well. A QoS threshold is preferably set so that a desired quality of radio signal is available for communicating at the lowest cost. When taking power consumption into account, which has a direct relationship to a mobile WTRU's battery life, the desired quality of radio signal which serves as a trigger to switch the communication may be different for different local networks and ad hoc networking because of relative cost factors. Also, where a WTRU is used as a relay for another WTRU's communication, the thresholds used by the WTRU's transceiver controller can be adjusted, for example, based on available battery life and the current use of the WTRU for its own communications.

Another criteria that can be included in setting QoS thresholds can be the type of communication to be conducted, for example voice communication between users 31 and 35 or data transfer of the phone book data on WTRU 33 to WTRU 37. In some instances, different QoS thresholds can be provided based on whether one or both types of communication are available. Video games represent another type of communications to which the thresholds can be set to give a preference to use of peer-to-peer communication for such communications.

In a 3GPP system, the size and priority of Service Data Units (SDUs) can be used among other parameters and criteria to formulate QoS decision factor thresholds. Other example parameters include maximum, mean, and supported data rates; signal delay; delay variation; and packet error.

Another variable criteria that can be used to formulate QoS decision factor thresholds to switch between the use of peer-to-peer techniques or infrastructure network communications include computed distances between respective stations. WTRUs equipped with a Global Positioning System (GPS) can provide the relevant data. Alternatively, distance information is readily obtained from known positioning techniques, such as time difference of arrival (TDOA) or adaptive antenna techniques where at least one fixed point is known, such as the location of a base station antenna. Preferably, a combination of criteria are employed which include maintaining the quality of the radio signal within an acceptable range of values.

A further variable criteria that can be used to formulate QoS decision factor thresholds to switch between the use of peer-to-peer techniques or infrastructure network communications is the volume of communication traffic in a particular geographic area serviced by one or more network base stations. In particular it is desirable to limit the amount of peer-to-peer signaling to avoid interference in a WLAN.

The volume of communication traffic in a particular geographic area can be determined by WTRUs sending a small packet to a network base station to test congestion conditions, i.e., interference level. The decision to switch from or to peer-to-peer communications within the geographic area can then be based at least in part on the resultant amount of interference caused by such test packets. Each WTRU can then control the switching to and from peer-to-peer communications, preferably based on thresholds set by the network serving the area. The network can accordingly formulate thresholds for switching the type of service using current traffic load as one criteria. As traffic load changes, the threshold values determined by the network may change accordingly. The network base stations servicing the relevant geographic area then broadcast the new threshold values over the air-interface to the WTRUs for use by the WTRU transceiver controllers.

Figure 3:
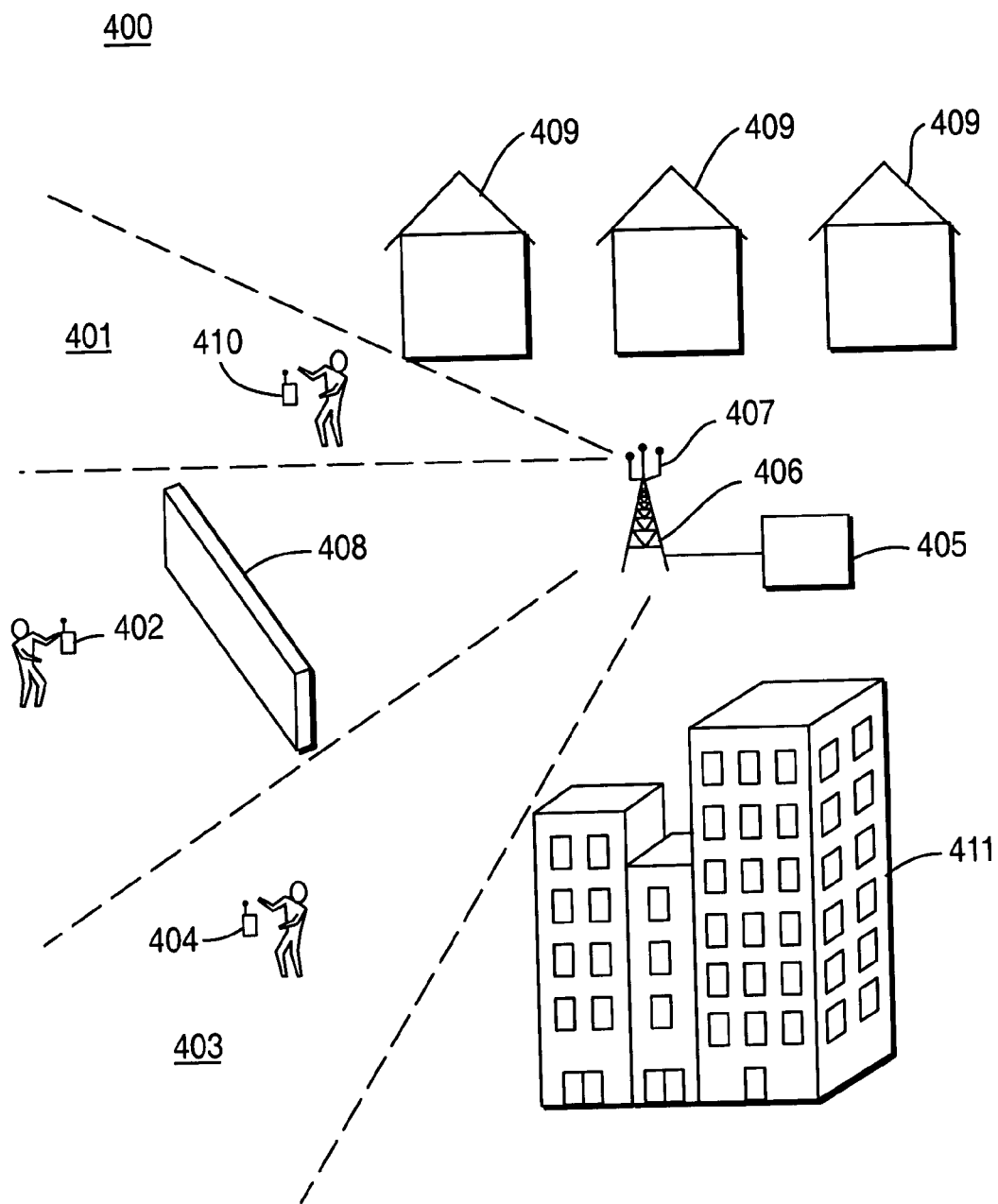
FIG. 3 is an illustration of a communications system operating in a hybrid mode showing several WTRUs, a base station, and various obstacles.

FIG. 3 illustrates an example of a network environment 400 where a hybrid mode can be used to expand the service area of a network base station 406 of a network 405. In view of obstacles such as an RF opaque wall 408, houses 409, and/or office buildings 411, the network base station 406 may employ a beam forming antenna 407 to only service selected geographic areas 401, 403 such that those areas are "hot spots" for network infrastructure communications via the base station 406. Even if beam forming is not employed, areas 401 and 403 and other unobstructed areas may be the only areas where there is an acceptable quality of radio signals for certain services due to the intervening obstacles. In such an environment 400, a WTRU 402 that is in an obstructed area, such as obstructed by wall 408, may not be able to conduct infrastructure mode communications with network 405 while another WTRU 404 that is about the same distance from the base station antenna 407 can use infrastructure mode communications. Also an obstacle, such as the wall 408 situated between the WTRU 410 and other WTRUs 402, 404 is an impediment to ad hoc mode communications. With conventional systems, WTRU 402 would not be able to communicate with WTRU 410 in either mode when located as illustrated in FIG. 3. Utilizing a hybrid mode in accordance with the invention, wireless communications can be conducted using WTRU 404 as a relay.

Since WTRU 402 is not in a geographic location for direct infrastructure mode communications with network 405, for WTRU 402 to communicate with WTRU 410, WTRU 402 can first attempt to establish an ad hoc mode communication directly with WTRU 410 by sending a beacon signal that indicates a request to establish an ad hoc communication with an identification code associated with WTRU 410. This attempt would fail in the illustrated scenario of FIG. 3 due to the obstructing wall 408. Such a communication failure can be indicated after a predetermined connection time expires without a connection being established. WTRU 402 then switches to a hybrid ad hoc mode. WTRU 402 can be configured to make such a switch either automatically or with user intervention, depending user preference.

As a preferred example, WTRU 402 initiates a hybrid ad hoc mode network by transmitting a beacon signal that includes a parameter requesting connection with a WTRU that is currently conducting an infrastructure mode communication along with a parameter indicating an identification of the WTRU with which communication is sought. A WTRU "joining" the hybrid ad hoc network conveys the identification parameter to the network through its infrastructure mode connection, which in turn attempts to establish an infrastructure communication with the identified WTRU.

In example illustrated in FIG. 3, WTRU 402 initiates a hybrid mode ad hoc network with WTRU 404 which relays an identification of WTRU 410 to the network 405 via an infrastructure communication with base station 406. The network 405 then seeks to communicate with the identified WTRU in a conventional manner through one of its base stations or an associated network as is well known in the art. In the example illustrated in FIG. 3, since WTRU 410 is within hot spot area 401 of base station 406, network 405 finds WTRU 410 at that location and an infrastructure mode communication is established with WTRU 410. The substance of the communication between WTRUs 402 and 410 is conveyed as both an ad hoc communication and infrastructure communication with WTRU 404 as a relay that, if necessary, appropriately converts the substantive communication data between the protocols and formats of the two communication modes. Preferably, all WTRUs configured for hybrid mode communications include appropriate relay conversion processing circuitry which operates transparent to the user of the WTRU.

In addition to or as an alternative to a hybrid mode that combines ad hoc and infrastructure mode communications, the WLAN ad hoc mode is preferably subject to restrictions, network control, or a selected combination of both. The inventors have observed that uncontrolled use of peer-to-peer communications may adversely affect the business model of the WLAN operator. Furthermore, an unrestricted ad hoc mode can also pose a security threat to the communication network, as malicious users may flood the communication area with unwanted data transmissions, thereby preventing legitimate use of the communication resources. Accordingly, the ad hoc mode and/or hybrid ad hoc mode is subject to one or more restrictions or controls.

Restrictions do not necessarily need network control and may be readily programmed into the configuration of a WTRU's ad hoc peer-to-peer communications mode. Examples of such restrictions include limiting ad hoc communications to among no more than a specified number of WTRUs, limiting the maximum duration of such communications, and limiting the type of data traffic permitted in peer-to-peer communications. Desired limits are preferably programmed as defaults in the WTRUs with the ability for the network to override the defaults.

Overriding restriction defaults is one type of network control of ad hoc mode communications. Alternatively, a comprehensive network control can be implemented that requires network permission to enable ad hoc mode in the WTRUs. Typically, such network controls are active when at least one of the WTRUs in an ad hoc network is also in communication with the network. Preferably, such a WTRU is designated as the "master" WTRU of an ad hoc network, which may shift the "master" designation from an initiating WTRU that is not in communication with the controlling network to another of the ad hoc communicating WTRUs. The "master" WTRU then can easily report ad hoc network communication statistics, such as length of connection, identity of connected WTRUs, type of connection, etc. to the controlling network.

Figure 2:
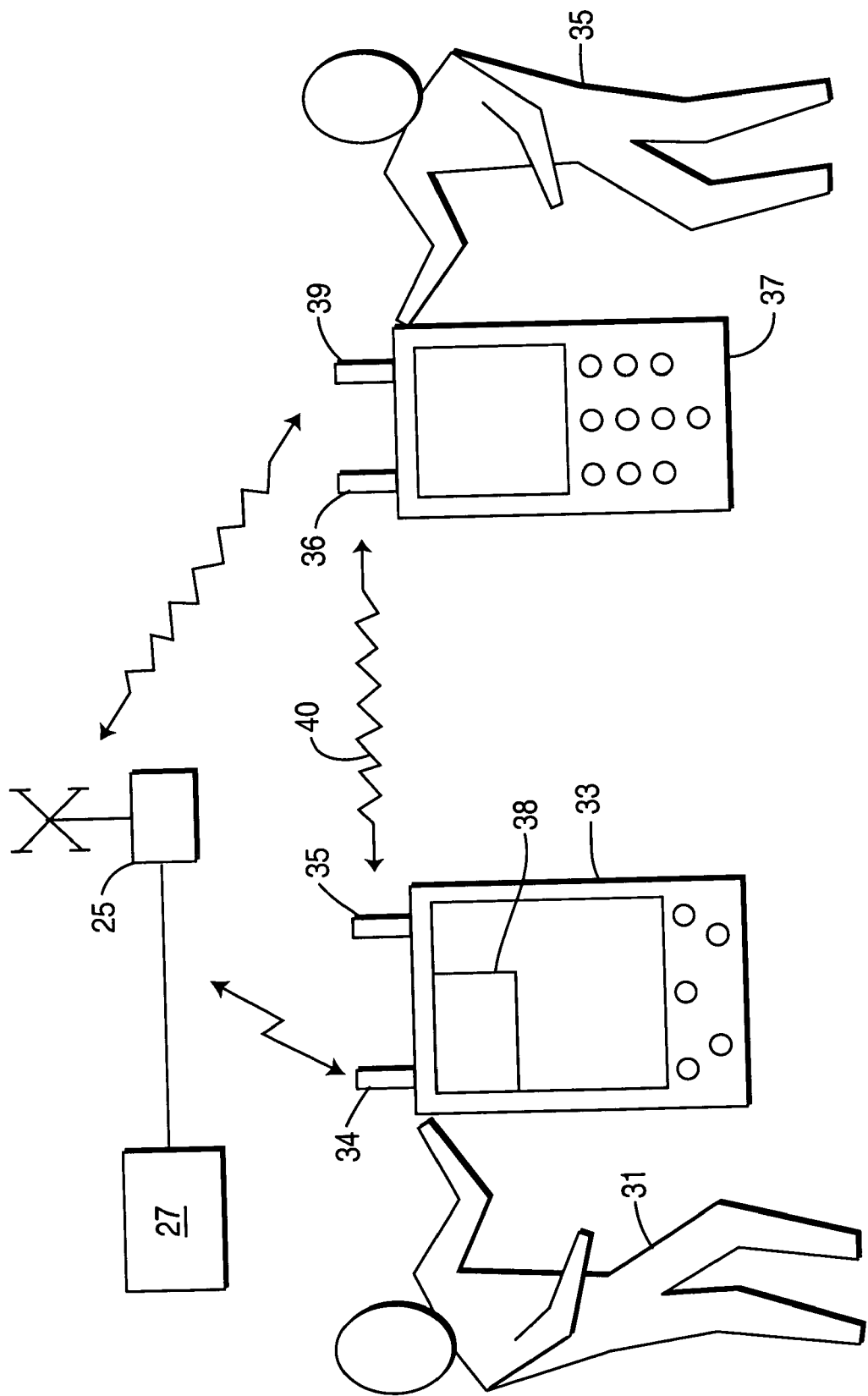
FIG. 2 is an illustration of a communications system operating in a hybrid mode showing two WTRUs and a base station.

Among the advantages of network control of ad hoc communication mode of the WTRUs is the ability for the network to utilize the WTRUs as network resources for increasing overall network communication capacity. Additionally, the network can track and/or charge for use of ad hoc mode services or enhanced services which are enabled where one of the WTRUs is also in communication with the network.

Where the network monitors ad hoc communication criteria such as quality of radio signals and/or WTRU separation distance, the network can switch a communication between two WTRUs from ad hoc mode to infrastructure mode where both WTRUs are in range of a network base station as illustrated in FIG. 2. When combined with a network's ability to monitor overall communications volume and traffic, the network's ability to selectively switch the mode of WTRU communications provides a tool for efficient network allocation of resources while maintaining a desired quality of radio signals for individual communications.

Such hybrid and controlled ad hoc modes are particularly suited for using WLAN modem equipped WTRUs employing 802.11 technology for peer-to-peer communications, but may be implemented with WTRUs employing other types of peer-to-peer communication systems. The controlling network may also be configured as a WLAN using infrastructure mode access point base stations built according to the IEEE 802.11b standard. However, the present invention can be implemented for any wireless communications network system, such as a time division duplex (TDD) or frequency division duplex (FDD) wireless telephone system where the WTRUs which communicate with network base stations are also capable of peer-to-peer communications.

What is claimed is:

1. A wireless transmit/receive unit (WTRU) for infrastructure communication in a wireless network via network base stations and for peer-to-peer communications with other such WTRUs comprising:

transceiver components that are configured for selective operation in an infrastructure communication mode for infrastructure communication with a network base station and in a peer-to-peer communications mode for peer-to-peer communications with other WTRUs; and a transceiver controller configured to selectively control peer-to-peer mode communications with other WTRUs based on communication signals received in infrastructure communications with a network base station and configured with selected default control limits for peer-to-peer mode communications including quality of service thresholds, a maximum duration of peer-to-peer communications such that the selected default control limits are selectively overridden based on communication signals received in infrastructure communications with a network base station.

2. The WTRU of claim 1 wherein the transceiver controller selected default control limits for peer-to-peer mode communications include a maximum duration of a peer-to-peer communication and a restriction as to types of data traffic permitted in peer-to-peer communications.

3. The WTRU of claim 1 wherein the transceiver components include a wireless local area network (WLAN) modem for the peer-to-peer communications with other WTRUs.

4. The WTRU of claim 1 wherein the transceiver controller is configured to control the transceiver components to switch between infrastructure communication mode and peer-to-peer communication mode based on Quality of Service criteria.

5. The WTRU of claim 1 wherein the WTRU is a mobile unit and the transceiver controller is configured to control the transceiver components to switch between infrastructure communication mode and peer-to-peer communication mode based on an estimate of the geographic location of the mobile unit.

6. The WTRU of claim 5 further comprising a Global Positioning System (GPS) for generating the estimate of the geographic location of the mobile unit.

7. The WTRU of claim 1 wherein the transceiver components are configured to selectively function in a relay mode to relay a communication between a network base station via infrastructure communication mode and another WTRU via peer-to-peer communication mode, and the transceiver controller is configured to control the transceiver components to function in the relay mode to based on Quality of Service criteria.

8. The WTRU of claim 1 wherein the transceiver controller is configured to control each peer-to-peer mode communications based on settings received in infrastructure communications with a network base station.

9. The WTRU of claim 1 wherein the transceiver controller is configured with selected default control limits for peer-to-peer mode communications that include quality of service thresholds formulated based on quality of radio signal, power consumption, and/or cost of communication.

10. A method of wireless communication for a wireless transmit/receive unit (WTRU) having transceiver components that are configured for selective operation in an infrastructure communication mode for infrastructure communication in a wireless network via a network base station and in a peer-to-peer communications mode for peer-to-peer communications with other WTRUs also configured for infrastructure communication in the wireless network, the method comprising:

selectively controlling peer-to-peer mode communications with other WTRUs based on communication signals received in infrastructure communications with a network base station; and using selected default control limits for peer-to-peer mode communications and overriding said defaults based on communication signals received in infrastructure communications with a network base station.

11. The method of claim 10 wherein a maximum duration of a peer-to-peer communication and a restriction as to types of data traffic permitted in peer-to-peer communications are included as the default control limits used for peer-to-peer mode communications.

12. The method of claim 10 wherein a wireless local area network (WLAN) modem is used for the peer-to-peer communications with other WTRUs.

13. The method of claim 10 wherein the transceiver components are switched between infrastructure communication mode and peer-to-peer communication mode based on Quality of Service criteria.

14. The method of claim 10 wherein the WTRU is a mobile unit and the transceiver components are switched between infrastructure communication mode and peer-to-peer communication mode based on an estimate of the geographic location of the mobile unit and or an estimate of congestion.

15. The method of claim 14 wherein the WTRU includes a Global Positioning System (GPS), the method further comprising the step of using the GPS for generating the estimate of the geographic location of the mobile unit and sending test packets from the WTRU to generate an estimate of congestion.

16. The method of claim 10 wherein the transceiver components are configured to selectively function in a relay mode to relay a communication between a network base station via infrastructure communication mode and another WTRU via peer-to-peer communication mode, the method further comprising the step of controlling the transceiver components to function in the relay mode based on Quality of Service criteria.

17. The method of claim 10 using settings received in infrastructure communications with a network base station to control each peer-to-peer mode communication.

* * * * *

UNITED STATES PATENT AND TRADEMARK OFFICE
CERTIFICATE OF CORRECTION

| | | |
|---|---|---|
| PATENT NO. | : 7,016,673 B2 | |
| APPLICATION NO. | : 10/675893 | |
| DATED | : March 21, 2006 | |
| INVENTOR(S) | : Reddy et al. | |

It is certified that error appears in the above-identified patent and that said Letters Patent is hereby corrected as shown below:

IN THE ABSTRACT

At Item (56), U.S. PATENT DOCUMENTS, page 2, left column, line 5, delete "2003/0174682 A1 9/2003 Baker, Jr." and insert therefor --2003/0174682 A1 9/2003 Barker, Jr--.

IN THE SPECIFICATION

At columns 2 and 3, the text of application page #4 was entered BEFORE the text of application page #3. Therefore, Delete patent copy beginning with column 2, line 49, beginning with the word "systems", through to column 3, line 22, ending with the words "ad hoc" and INSERT at column 2, line 10, after the word "such".

At column 4, line 45, after the words "for the", delete "peer to peer" and insert therefor --peer-to-peer--.

At column 4, line 51, after the words "mode and", delete "peer to peer" and insert therefor --peer-to-peer--.

At column 4, line 63, after the word "mode", delete "to".

At column 5, line 14, after the word "configured", insert "to".

At column 5, line 33, after the word "transmissions", delete "form" and insert therefor --from--.

At column 5, line 48, after the word "based", insert --on--.

At column 5, line 52, after the words "used for", delete "peer to peer" and insert therefor --peer-to-peer--..

At column 6, line 29, after "WTRUs", insert --.--.

At column 6, line 44, after the word "wish", insert "to".

At column 7, line 26, after the word "use", delete "of".

At column 8, line 42, after the word "depending", insert "upon".

UNITED STATES PATENT AND TRADEMARK OFFICE
CERTIFICATE OF CORRECTION

PATENT NO. : 7,016,673 B2
APPLICATION NO. : 10/675893
DATED : March 21, 2006
INVENTOR(S) : Reddy et al.

It is certified that error appears in the above-identified patent and that said Letters Patent is hereby corrected as shown below:

IN THE CLAIMS

At claim 1, column 10, lines 28-30, after the word "duration", delete "of peer-to-peer communications such that the selected default control limits are selectively", and insert therefor --of a peer-to-peer communication or a restriction as to types of data traffic permitted in peer-to-peer communications such that the selected default control limits can be--.

At claim 7, column 10, line 62, after the word "mode", delete "to".

At claim 10, column 11, line 18, after the word "station;", delete "and".

At claim 10, column 11, line 20, after the word "communications", insert --including quality of service thresholds, a maximum duration of a peer-to-peer communication or a restriction as to types of data traffic permitted in peer-to-peer communications;--.

At claim 10, column 11, line 20, after the word "and", begin a new paragraph starting with "overriding" and ending with "station".

At claim 14, column 12, lines 9-10, after the word "unit", delete "and or" and insert therefor --and/or--.

Signed and Sealed this

Ninth Day of January, 2007

JON W. DUDAS
*Director of the United States Patent and Trademark Office*